(12) United States Patent
Tokiwa et al.

(10) Patent No.: US 11,535,059 B2
(45) Date of Patent: Dec. 27, 2022

(54) MOTORCYCLE TYRE

(71) Applicant: Sumitomo Rubber Industries, Ltd., Kobe (JP)

(72) Inventors: Chihiro Tokiwa, Kobe (JP); Shuji Kobori, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 123 days.

(21) Appl. No.: 17/112,312

(22) Filed: Dec. 4, 2020

(65) Prior Publication Data
US 2021/0197619 A1   Jul. 1, 2021

(30) Foreign Application Priority Data
Dec. 26, 2019   (JP) .............................. JP2019-236948

(51) Int. Cl.
*B60C 9/22* (2006.01)
*B60C 9/20* (2006.01)
*B60C 9/00* (2006.01)

(52) U.S. Cl.
CPC .......... *B60C 9/2006* (2013.01); *B60C 9/0007* (2013.01); *B60C 2009/0092* (2013.01); *B60C 2009/2276* (2013.01); *B60C 2009/2285* (2013.01); *B60C 2200/10* (2013.01)

(58) Field of Classification Search
CPC ........ B60C 2200/10; B60C 2009/2252; B60C 2009/2261; B60C 2009/2276; B60C 2009/2214; B60C 2009/2285; B60C 9/0057
See application file for complete search history.

(56) References Cited

U.S. PATENT DOCUMENTS
2018/0281521 A1   10/2018   Yamaguchi

FOREIGN PATENT DOCUMENTS
JP        2018-167716 A     11/2018

*Primary Examiner* — Justin R Fischer
(74) *Attorney, Agent, or Firm* — Birch, Stewart, Kolasch & Birch, LLP

(57) ABSTRACT

A motorcycle tyre includes a tread portion, a pair of bead portions, a toroidal carcass extending between the pair of bead portions, and a band layer disposed outward in a tyre radial direction of the carcass and inside the tread portion. The band layer includes a band ply having one or more steel cords spirally wound in a tyre circumferential direction. The tyre has a parameter (A) in which a load index LI (kg) of the tyre is divided by a bending/compression stiffness ratio that is obtained by dividing a bending stiffness (g·cm) of the steel cords by a compression stiffness (N/mm) of the steel cords being in a range of 1500 to 6000.

16 Claims, 3 Drawing Sheets

MOTORCYCLE TYRE

BACKGROUND ART

Field of the Disclosure

The present disclosure relates to a motorcycle tyre.

Description of the Related Art

The following Patent document 1 discloses a motorcycle tyre including a carcass and a band layer disposed radially outwardly of the carcass. The band layer includes a band ply including one or more steel band cords wound spirally in the tyre circumferential direction. In the tyre, compressive stiffness and bending stiffness of the band cords are limited to a certain range to improve handling stability.

[Patent Document]
[Patent document 1] Japanese Unexamined Patent Application Publication 2018-167716

SUMMARY OF THE DISCLOSURE

Generally, it has been required that braking force should increase gradually in proportion to the deceleration (the acceleration opposite to the direction of travel) of a motorcycle from the start of braking to the end. However, depending on tyres, there was a case in which braking force increased rapidly during a period from the start of braking to the end. Thus, improving stability during braking (hereinafter referred to as "braking stability") has been required. In particular, for tyres used under severe conditions, such as racing tyres, superior braking stability is required as it has a significant impact on lap times.

The inventors have studied rapid changes in braking force as described above. As a result, it has been found that when compressive rigidity of the band cords is relatively high, some of the band cords located in the tread contact region bend suddenly in the tyre radial direction of the tread contact region in the middle of braking in a waving manner. Then, it is assumed that waving of the band cords in the middle of braking causes rapid increase or decrease an area of the tread contact region, leading to rapid changes in braking force.

The present disclosure has been made in view of the above circumstances and has a major object to provide a motorcycle tyre capable of improving braking stability.

In one aspect of the disclosure, a motorcycle tyre includes a tread portion, a pair of bead portions, a toroidal carcass extending between the pair of bead portions, and a band layer disposed outward in a tyre radial direction of the carcass and inside the tread portion, the band layer including a band ply having one or more steel cords spirally wound in a tyre circumferential direction, wherein the tyre has a parameter (A) in which a load index LI (kg) of the tyre is divided by a bending/compression stiffness ratio that is obtained by dividing a bending stiffness (g·cm) of the steel cords by a compression stiffness (N/mm) of the steel cords being in a range of 1500 to 6000.

In another aspect of the disclosure, the bending stiffness of the steel cords may be in a range of 16 to 50 (g·cm).

In another aspect of the disclosure, the steel cords may include a plurality of twisted filaments and rubber filled between the plurality of filaments.

In another aspect of the disclosure, a parameter (B) of the steel cords in which a number of filaments of each steel cord is divided by a twisting pitch (mm) of a respective one of the steel cords may be less than 1.5 (threads/mm).

In another aspect of the disclosure, the band ply may be formed by winding a ribbon ply spirally in the tyre circumferential direction, and the ribbon ply may include five or less of the steel cords and a topping rubber coating the steel cords.

In another aspect of the disclosure, the parameter (A) may be in a range of 2500 to 5000.

In another aspect of the disclosure, the parameter (A) may be in a range of 3000 to 4500.

DESCRIPTION OF THE PREFERRED EMBODIMENTS

An embodiment of the present disclosure will be explained below with reference to the accompanying drawings.

Figure 1:
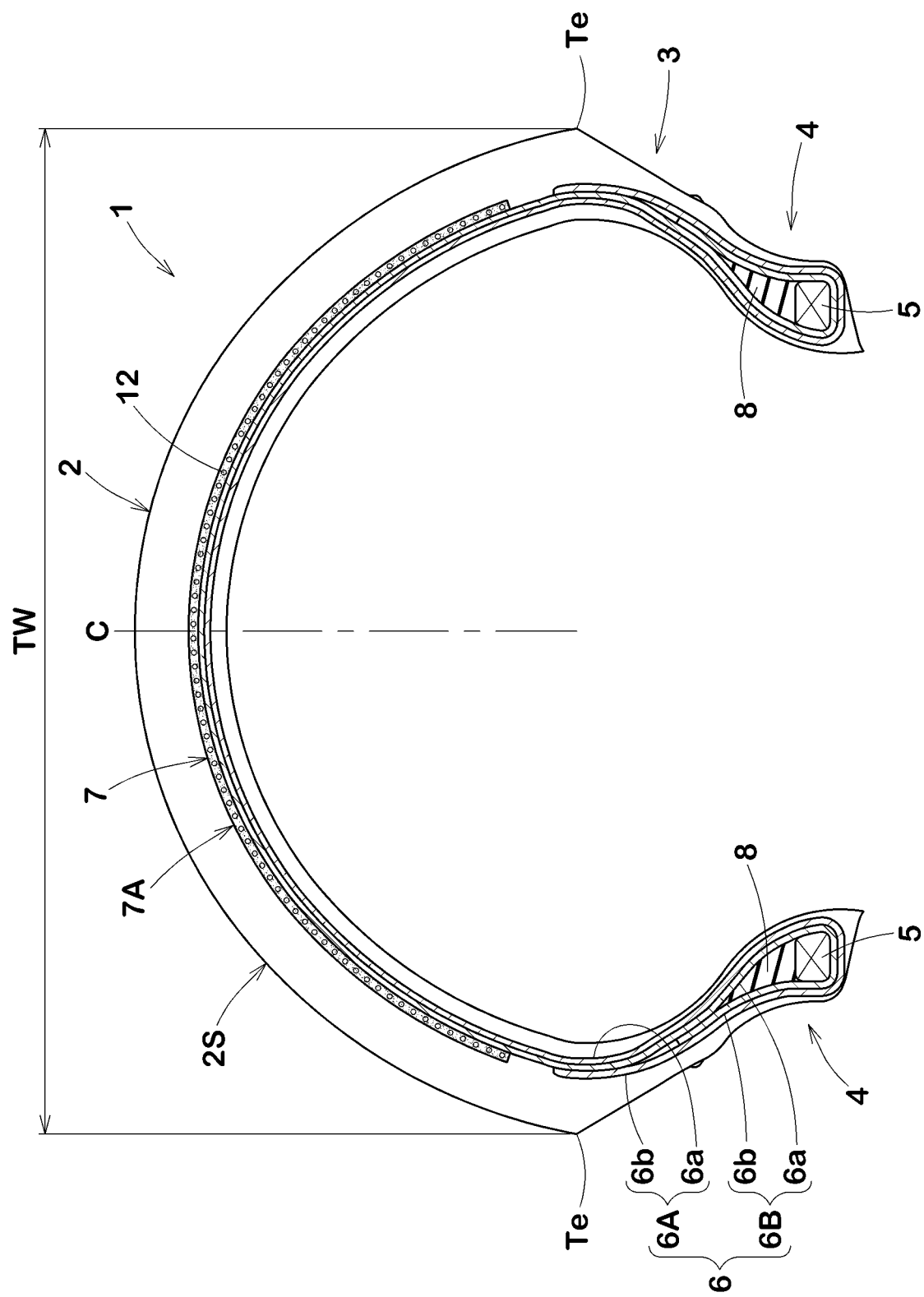
FIG. 1 is a cross-sectional view of a motorcycle tyre according to an embodiment of the disclosure.

FIG. 1 is a cross-sectional view of a motorcycle tyre (hereinafter, simply referred to as "tyre") 1 according to an embodiment of the disclosure. The tyre 1 according to the present embodiment, for example, may suitably be used for a road race. Note that the present disclosure is not limited to the above aspect.

The tyre 1 includes a tread portion 2, and a pair of bead portions 4 each with a bead core 5 therein. In the present embodiment, the tread portion 2 has a tread surface 2S extending between tread edges Te through the tyre equator C so as to protrude radially outwardly in an arc shape manner. The tread width TW which is a distance in the tyre axial direction between the tread edges Te corresponds to the tyre maximum width. Thus, the tyre 1 is capable of cornering with large bank angles.

The tyre 1 according to the present embodiment includes a toroidal carcass 6 extending between the pair of bead portions 4, and a band layer 7 disposed outward in a tyre radial direction of the carcass and inside the tread portion 2.

The carcass 6 includes at least one carcass ply. In the present embodiment, the carcass 6 includes two carcass plies that includes an inner carcass ply 6A, and an outer carcass ply 6B disposed radially outwardly of the inner carcass ply 6A at the location of the tyre equator C. Each of the inner carcass ply 6A and the outer carcass ply 6B includes a main portion 6a extending between the bead cores 5 of the bead portions 4 through the tread portion 2 and sidewall portions 3, and a pair of turn-up portion 6b each turned up around a respective one of the bead cores 5. A bead apex rubber 8 that extends radially outwardly from a respective one of the bead cores 5 is disposed between the main portion 6a and a respective one of the turn-up portions 6b.

The inner carcass ply 6A and the outer carcass ply 6B include carcass cords (not illustrated). The carcass cords are oriented at an angle of 60 to 90 degrees with respect to the tyre circumferential direction, for example. As the carcass cords, an organic fiber cord, such as nylon, polyester, rayon and the like may preferably be employed, for example.

Figure 2:
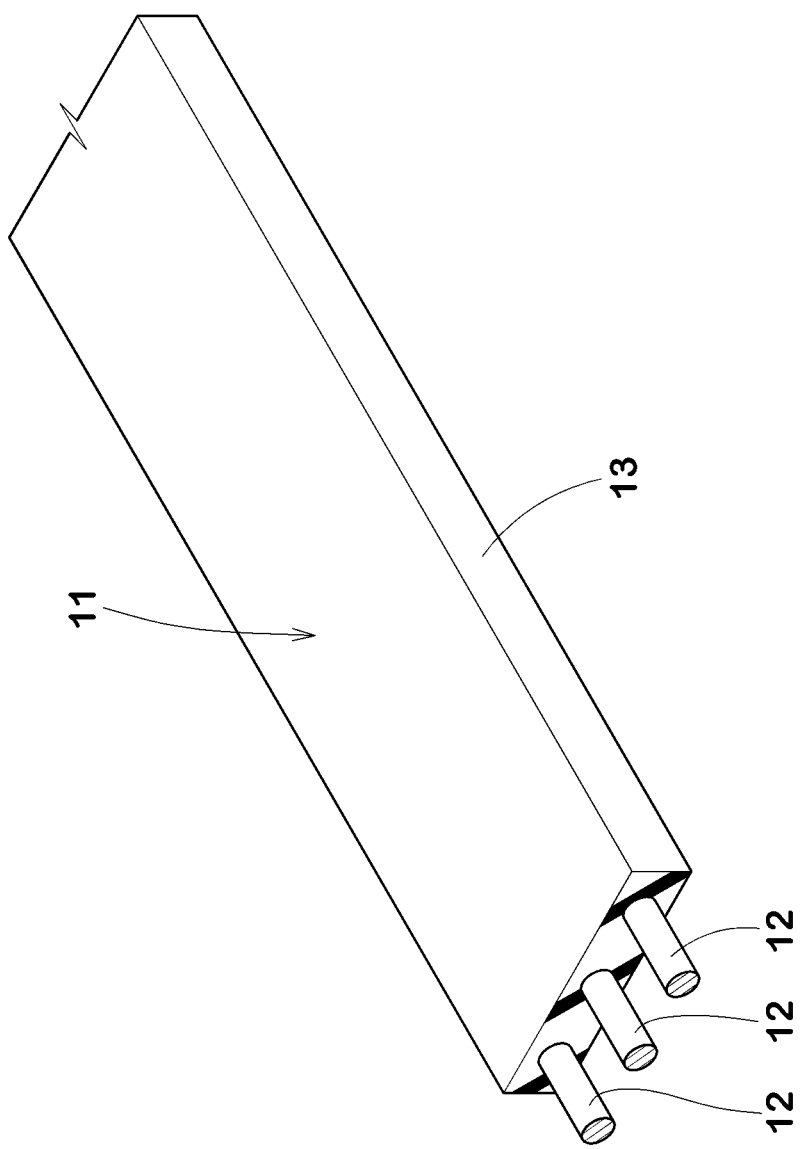
FIG. 2 is a partial perspective view of a ribbon ply according to an embodiment.

The band layer 7 includes at least one band ply 7A, and in the present embodiment, one band ply 7A is employed. The band ply 7A has one or more steel cords 12 spirally wound in the tyre circumferential direction. FIG. 2 is a partial perspective view of one example of a ribbon ply 11.

The band ply 7A according to the present embodiment (shown in FIG. 1) is formed by arranging the ribbon ply 11 shown in FIG. 2 (e.g., by winding the ribbon ply 11 spirally) in the tyre circumferential direction. The ribbon ply 11 is configured to include one or more steel cords 12 (a plurality of steel cords 12 in the present example) and a topping rubber 13 coating the steel cords 12.

Figure 3:
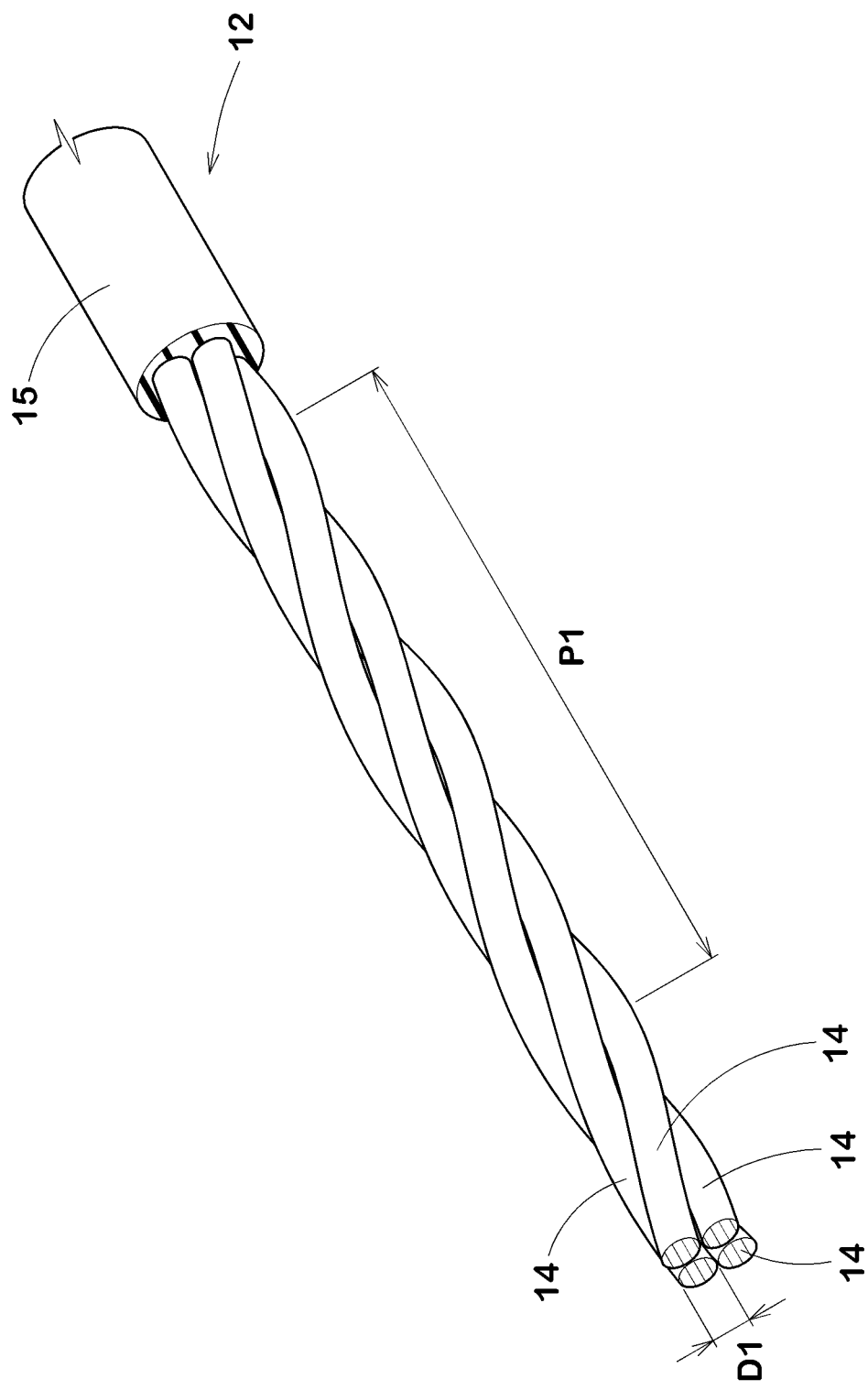
FIG. 3 is a partial perspective view of a steel cord according to an embodiment.

FIG. 3 is a partial perspective view of one of the steel cords according to an embodiment. In the present embodiment, each steel cord 12 includes a plurality of twisted filaments 14. As a steel cord 12, FIG. 3 illustrates a single-twisted cord with a 1×4 structure in which four filaments 14 are twisted together. Note that the steel cords 12 are not limited to such an aspect. As the steel cords 12, for example, a single-twisted cord with a 1×5 structure, and a double twisted cord with a 3×3 structure may be adopted. Further, as the filaments 14, one or more pre-molded filaments (not illustrated) that are given a predetermined shape at a state before twisting, as in Patent Document 1, may be employed.

In the present embodiment, the plurality of twisted filaments 14 is coated with rubber 15. Thus, in the present embodiment, the rubber 15 is filled between the filaments 14. The rubber 15 according to the present embodiment has the same composition as the topping rubber 13 of the band ply 7A shown in FIG. 2. Note that the tubber 15 is not limited to such an aspect. The rubber 15 can prevent the filaments 14 of the steel cord 12 from contacting directly with one another so that damages due to contacting of the filaments 14 with one another is prevented.

In the present embodiment, the tyre 1 has a parameter (A) in which a load index LI (kg) of the tyre 1 is divided by a bending/compression stiffness ratio that is obtained by dividing a bending stiffness (g·cm) of the steel cords by a compression stiffness (N/mm) of the steel cords 12 being in a range of 1500 to 6000.

The load index LI is an index which indicates the maximum mass (maximum load capacity) that can be supported by a single tyre 1 (shown in FIG. 1). In the present embodiment, the maximum load capacity (kg) corresponding to the Load Index LI of the tyre 1 is specified based on the "Table of correspondence between air pressure and load capacity" defined by the standard organization on which the tyre 1 is based.

The bending stiffness (g/cm) is a bending stiffness of a single steel cord 12. The compressive stiffness (N/mm) is a compressive stiffness of a single steel cord 12. In the present embodiment, the bending stiffness and the compressive stiffness of the steel cord 12 are measured according to the procedure for measuring the compressive stiffness and the bending stiffness of the band cord as described in the above-mentioned Patent document 1.

The compressive stiffness and the bending stiffness of the steel cord 12 can be adjusted as described in Patent Document 1. In this embodiment, the compressive stiffness and the bending stiffness of the steel cord 12, for example, may be adjusted by changing a twisting pitch P1 of the steel cord 12, the number of filaments 14, the outer diameter D1 of the filaments 14, and the number of pre-molded filaments (not illustrated).

The bending/compression stiffness ratio specifies the relationship between the bending stiffness (g·cm) and the compressive stiffness (N/mm) of the steel cords 12. The parameter (A), which indicates the relationship between the bending/compression stiffness ratio and the load index (kg), is limited to 1500 to 6000, so that the binding/compression stiffness ratio is set in a certain range in relation to the load index (maximum load capacity).

In the present embodiment, by setting the parameter (A) into the above range, the bending/compression stiffness ratio with respect to the load index is greater than that of the conventional steel cords. When braking a motorcycle, such steel cords 12 receive compressive force (magnitude thereof is related to the magnitude of the load index (maximum load capacity)) at the tread contact region, they may buckle easily at or immediately the start of braking. In the present embodiment, the steel cords 12 located in the tread contact region can deform in a wavy manner. Such a wave-like deformation can make an area of the tread contact region linearly change and can stabilize braking force compared to that without the wave-like deformation.

The tyre 1 according to the present embodiment (shown in FIG. 1) can generate wave-like deformation of the steel cord 12 located in the tread contact region from or immediately after the start of braking. Thus, the tyre 1 can suppress a rapid change in area of the tread contact region from the start of braking to the end. As a result, the tyre 1 according to the present embodiment can gradually increase braking force from the start to the end of braking of a motorcycle so as to be proportional to deceleration of the vehicle (acceleration opposite to the traveling direction). Therefore, the tyre 1 according to the present embodiment can provide a stable braking force during braking.

Furthermore, the tyre 1 according to the present embodiment (shown in FIG. 1) is capable of causing a wave-like deformation to the steel cords 12, which are located in the tread contact region, when a motorcycle starts to turn or immediately afterwards. Thus, the tyre 1 according to the present embodiment can gradually increase cornering force in proportion to the load on the tyre 1 during cornering, and thus handling stability can be improved.

In the present embodiment, the bending/compression stiffness ratio of the steel cord 12 can be increased relatively by setting the parameter (A) to less than 6000. As a result, the tyre 1 (shown in FIG. 1) according to the present embodiment can deform the steel cords 12, which are located in the tread contact region, in a wave-like manner from the start of braking or immediately afterwards. Thus, the tyre 1 according to the present embodiment can prevent a rapid change in area of the tread contact region in the middle of braking.

On the other hand, in the present embodiment, the bending stiffness of the steel cords 12 can be prevented from being higher than necessary by setting the parameter (A) to more than 1500. Thus, in the tyre 1 according to the present embodiment (shown in FIG. 1), the compression input to the steel cords 12 can be converted to bent the steel cords 12 when the vehicle is braking. Thus, the tyre 1 according to the present embodiment (shown in FIG. 1) can deform the steel cords 12 to a wavy-like manner at or immediately after the start of braking. This can prevent a rapid change in area of the tread contact region in the middle of braking. In addition, the steel cords 12 are prevented from increasing its bending stiffness. Thus, in a forming process of the band ply 7A in which the ribbon ply 11 (shown in FIG. 2) is wound, the steel cords 12 can be positioned along the outer surface of the outer carcass ply 6B (shown in FIG. 1), which is curved in a convex arc. This can improve the formability of the band ply 7A, and thus it can prevent the steel cords 12 (in particular, the winding end of the steel cords 12) from being lifted out in the tyre radial direction.

In order to further improve the effect as mentioned above, the parameter (A) is preferably equal to or less than 5000, more preferably equal to or less than 4500, but preferably equal to or more than 2500, more preferably equal to or more than 3000.

Preferably, the bending stiffness of the steel cords 12 is in a range of 16 to 50 (g·cm). In the present embodiment, by setting the bending stiffness equal to or less than 50 (g·cm), compression input to the steel cords 12 acting when a motorcycle is braking is converted into bending deformation of the steel cords 12. Thus, the tyre 1 according to the present embodiment (shown in FIG. 1) can deform the steel cords 12 to a wavy-like manner at or immediately after the start of braking. Further, by setting the bending stiffness equal to or less than 50 (g·cm), the steel cords 12 are flexible and bent easily, which increases resistance to bending fatigue (durability of the steel cords 12).

On the other hand, in the present embodiment, the bending stiffness is set to 16 (g-cm) or more, which can prevent wavy-deformation of the steel cords 12 from becoming larger than necessary. As a result, the tyre 1 according to the present embodiment (shown in FIG. 1) can maintain rigidity of the tread contact surface, and thus braking and handling stability may be improved. In order to further improve the effect as mentioned above, the bending stiffness is preferably equal to or less than 40 (g·cm), and preferably equal to or more than 25 (g·cm).

Preferably, the compression stiffness of the steel cords 12 is in a range of 150 to 350 (N/mm). By setting the compression stiffness equal to or less than 350 (N/mm), a wavy-like deformation of the steel cords 12 in the tread ground region of the tyre 1 can occur at the start of braking or immediately afterwards. Further, by setting the compression stiffness equal to or less than 350 (N/mm), the compression input to the steel cords 12 can be converted into its wavy bending deformation. As a result, the tyre 1 according to the present embodiment can increase compression fatigue resistance (durability) of the steel cords 12.

On the other hand, by setting the compression stiffness equal to or more than 150 (N/mm), wavy-like deformation of the steel cords 12 is prevented from becoming larger than necessary. In order to further improve the effect as mentioned above, the compression stiffness is preferably equal to or less than 300 (N/mm), and preferably equal to or more than 200 (N/mm).

In the steel cords 12 according to the present embodiment, the rubber 15 is filled between the filaments 14. Such rubber 15 is capable of absorbing part of the force acting on the filaments 14 of the steel cords 12, which are located in the tread contact region when a motorcycle is braking. As a result, the tyre 1 according to the present embodiment (shown in FIG. 1) can prevent the steel cords 12 from waving more than necessary, and thus improving braking and handling stability.

Preferably, a parameter (B) of each steel cord 12 in which the number of filaments 14 of each steel cord 12 is divided by a twisting pitch (mm) of a respective one of the steel cords 12 is less than 1.5 (threads/mm). This can prevent the steel cords 12 from becoming more dense than necessary. Thus, the steel cords 12 can prevent the steel cords 12 from increasing in outer diameter as well as from decreasing in compression stiffness more than necessary, even when the steel cords 12 are subjected to compression force during braking. Therefore, the tyre 1 of the present embodiment (shown in FIG. 1) can maintain stiffness of the tread contact region, improving braking and handling stability. In order to further improve the effect as mentioned above, the parameter (B) is preferably less than 1.0 (threads/mm).

Preferably, the parameter (B) is set equal to or more than 0.3 (threads/mm). This can prevent the compression stiffness of the steel cords 12 from being greater than necessary. Thus, the tyre 1 (shown in FIG. 1) according to the present embodiment can cause wavy-deformation of the steel cord 12 at the start of braking or immediately afterwards.

Preferably, the number of the steel cords 12 in the ribbon ply 11 shown in FIG. 2 is equal to or less than 5. This can prevent the tyre 1 according to the present embodiment (shown in FIG. 1) from having a large difference in the winding diameter of each steel cord 12 in the ribbon ply 11 due to the curvature of the outer carcass ply 6B. Thus, the tyre 1 can have a nearly uniform distribution of stiffness in the tyre axial direction of the band ply 7A, improving braking and handling stability. In order to further improve the effect as mentioned above, the number of the steel cords 12 in the ribbon ply 11 is preferably 4 or less, and more preferably 3 or less.

Preferably, the number of the steel cords 12 in the ribbon ply 11 is equal to or more than two. This can prevent the increase in the number of winding of the ribbon ply 11 in the manufacturing process of the tyre 1 (shown in FIG. 1) and thus prevents the increase in the manufacturing cost.

While the particularly preferable embodiments in accordance with the present disclosure have been described in detail, the present disclosure is not limited to the illustrated embodiments, but can be modified and carried out in various aspects.

Example

Tyres having the basic structure of FIG. 1 have been prototyped based on specifications in Tables 1 to 3 (Examples 1 to 23, and references 1 to 5). These tyres were evaluated for braking stability and formability of the band ply. The common specification of each tyre is as follows.

Tyre size: 120/70ZR17

Rim size: 17×3.5MT

Load index LI (Maximum load capacity): 58 (236 kg)

Tyre mounting position: Front wheel

Tyre pressure: 250 kPa

Motorcycle: two-wheeled motorcycles of 1000 cc displacement

The test method is as follows.

Braking Stability Test:

Under the above conditions, each test tyre is mounted on the front wheel of the above motorcycle. Then, a test rider rode the test vehicle on a dry asphalt test course to evaluate the braking stability by the rider's sensory using a 10-point method. The test results are shown in Tables 1 to 3. The higher value indicates the better the braking stability, meaning that braking force increases in proportion to the deceleration of the motorcycle during the braking.

Test for Formability of Band Ply:

The ribbon ply shown in FIG. 2 was wound around the tyre circumferential direction to form the band ply of each test tyre. After the winding of the ribbon ply was completed, the ends of steel cords were visually checked whether or not it floated outwardly in the tyre radial direction. The test results are shown in Tables 1 to 3 by "OK" when the steel cords did not float and "NG" when it floated.

Tables 1 to 3 show the test results.

TABLE 1

|  | Ref. 1 | Ref. 2 | Ref. 3 | Ex. 1 | Ex. 2 | Ex. 3 | Ex. 4 | Ex. 5 | Ref. 4 | Ex. 6 |
|---|---|---|---|---|---|---|---|---|---|---|
| Parameter (A) | 1450 | 1250 | 8230 | 2350 | 5340 | 3430 | 4210 | 1820 | 1328 | 1549 |
| Bending stiffness (g · cm) of steel cords | 16 | 42 | 11 | 16 | 80 | 43 | 32 | 25 | 16 | 16 |
| Compression stiffness of steel cords (N/mm) | 98.3 | 222.5 | 383.6 | 159.3 | 1810.2 | 625.0 | 570.8 | 192.8 | 90.0 | 105.0 |
| Bending/compression stiffness ratio | 0.163 | 0.189 | 0.029 | 0.1 | 0.044 | 0.069 | 0.056 | 0.13 | 0.178 | 0.152 |
| Number of steel cord in ribbon ply | 3 | 3 | 3 | 3 | 3 | 5 | 3 | 3 | 3 | 3 |
| Number of filaments in steel cord | 9 | 4 | 4 | 4 | 4 | 5 | 9 | 9 | 4 | 4 |
| Twisting pitch (mm) | 6.0 | 12.0 | 6.0 | 12.0 | 6.0 | 12.0 | 6.0 | 6.0 | 12.0 | 12.0 |
| Parameter (B) | 1.50 | 0.33 | 0.67 | 0.33 | 0.67 | 0.42 | 1.50 | 1.50 | 0.33 | 0.33 |
| Rubber between filaments | presence | presence | presence | presence | presence | presence | presence | presence | presence | presence |
| Braking stability (10-point method) | 6.7 | 7 | 4 | 8.2 | 8.3 | 6.8 | 8.1 | 8.1 | 6.9 | 8.1 |
| Formability of band ply | NG | NG | OK | OK | OK | OK | OK | OK | NG | OK |

TABLE 2

|  | Ex. 7 | Ex. 8 | Ex. 9 | Ex. 10 | Ex. 11 | Ref. 5 | Ex. 12 | Ex. 13 | Ex. 14 | Ex. 15 |
|---|---|---|---|---|---|---|---|---|---|---|
| Parameter (A) | 2500 | 3000 | 4500 | 5000 | 6000 | 6195 | 5715 | 3200 | 2667 | 2000 |
| Bending stiffness (g · cm) of steel cords | 16 | 16 | 16 | 16 | 16 | 16 | 14 | 25 | 30 | 40 |
| Compression stiffness of steel cords (N/mm) | 169.5 | 203.4 | 305.1 | 339.0 | 406.8 | 420.0 | 339.0 | 339.0 | 339.0 | 339.0 |
| Bending/compression stiffness ratio | 0.094 | 0.079 | 0.052 | 0.047 | 0.039 | 0.038 | 0.041 | 0.074 | 0.088 | 0.118 |
| Number of steel cord in ribbon ply | 3 | 3 | 3 | 3 | 3 | 3 | 3 | 3 | 3 | 3 |
| Number of filaments in steel cord | 4 | 4 | 4 | 4 | 4 | 4 | 4 | 4 | 4 | 4 |
| Twisting pitch (mm) | 12.0 | 12.0 | 12.0 | 12.0 | 12.0 | 12.0 | 12.0 | 12.0 | 12.0 | 12.0 |
| Parameter (B) | 0.33 | 0.33 | 0.33 | 0.33 | 0.33 | 0.33 | 0.33 | 0.33 | 0.33 | 0.33 |
| Rubber between filaments | presence | presence | presence | presence | presence | presence | presence | presence | presence | presence |
| Braking stability (10-point method) | 8.3 | 8.4 | 8.4 | 8.3 | 8.1 | 6 | 8 | 8.4 | 8.5 | 8.4 |
| Formability of band ply | OK | OK | OK | OK | OK | OK | OK | OK | OK | OK |

TABLE 3

|  | Ex. 16 | Ex. 17 | Ex. 18 | Ex. 19 | Ex. 20 | Ex. 21 | Ex. 22 | Ex. 23 |
|---|---|---|---|---|---|---|---|---|
| Parameter (A) | 1600 | 1539 | 5000 | 5000 | 5000 | 5000 | 5000 | 5000 |
| Bending stiffness (g · cm) of steel cords | 50 | 52 | 16 | 16 | 16 | 16 | 16 | 16 |
| Compression stiffness of steel cords (N/mm) | 339.0 | 339.0 | 339.0 | 339.0 | 339.0 | 339.0 | 339.0 | 339.0 |
| Bending/compression stiffness ratio | 0.147 | 0.153 | 0.047 | 0.047 | 0.047 | 0.047 | 0.047 | 0.047 |
| Number of steel cord in ribbon ply | 3 | 3 | 5 | 6 | 3 | 3 | 3 | 3 |
| Number of filaments in steel cord | 4 | 4 | 4 | 4 | 4 | 4 | 4 | 4 |
| Twisting pitch (mm) | 12.0 | 12.0 | 12.0 | 12.0 | 15.0 | 2.7 | 2.4 | 2.4 |
| Parameter (B) | 0.33 | 0.33 | 0.33 | 0.33 | 0.27 | 1.48 | 1.67 | 1.67 |
| Rubber between filaments | presence | presence | presence | presence | presence | presence | presence | none |
| Braking stability (10-point method) | 8.3 | 8 | 8.1 | 7.9 | 8.0 | 8.2 | 7.9 | 8.1 |
| Formability of band ply | OK | OK | OK | OK | OK | OK | OK | OK |

As a result of the tests, the example tyres have improved braking stability compared to the comparative example tyres, while maintaining the formability of band ply.

What is claimed is:
1. A motorcycle tyre comprising:
a tread portion;
a pair of bead portions;
a toroidal carcass extending between the pair of bead portions; and
a band layer disposed outward in a tyre radial direction of the carcass and inside the tread portion, the band layer comprising a band ply having one or more steel cords spirally wound in a tyre circumferential direction, wherein
the tyre satisfies a parameter (A) in which a load index LI (kg) of the tyre is divided by a bending/compression stiffness ratio that is obtained by dividing a bending stiffness (g cm) of the steel cords which is in a range of 16 to 50 g cm by a compression stiffness (N/mm) of the steel cords, wherein the parameter (A) is being in a range of 1500 to 6000.

2. The motorcycle tyre according to claim 1, wherein the steel cords comprise a plurality of twisted filaments and rubber filled between the plurality of filaments.

3. The motorcycle tyre according to claim 2, wherein a parameter (B) of the steel cords in which a number of filaments of each steel cord is divided by a twisting pitch (mm) of a respective one of the steel cords is less than 1.5 (threads/mm).

4. The motorcycle tyre according to claim 3, wherein
the band ply is formed by winding a ribbon ply spirally in the tyre circumferential direction, and
the ribbon ply comprises five or less of the steel cords and a topping rubber coating the steel cords.

5. The motorcycle tyre according to claim 3, wherein the parameter (A) is in a range of 3000 to 4500.

6. The motorcycle tyre according to claim 5, wherein the bending stiffness of the steel cords is in a range of 25 to 40 (g cm).

7. The motorcycle tyre according to claim 6, wherein the compression stiffness of the steel cords is in a range of 150 to 300 (N/mm).

8. The motorcycle tyre according to claim 2, wherein
the band ply is formed by winding a ribbon ply spirally in the tyre circumferential direction, and
the ribbon ply comprises five or less of the steel cords and a topping rubber coating the steel cords.

9. The motorcycle tyre according to claim 2, wherein the parameter (A) is in a range of 3000 to 4500.

10. The motorcycle tyre according to claim 2, wherein the band ply is formed by winding a ribbon ply spirally in the tyre circumferential direction, the ribbon ply comprises five or less of the steel cords and a topping rubber coating the steel cords, and the rubber filled between the plurality of filaments has a same composition as that of the topping rubber.

11. The motorcycle tyre according to claim 1, wherein
the band ply is formed by winding a ribbon ply spirally in the tyre circumferential direction, and
the ribbon ply comprises five or less of the steel cords and a topping rubber coating the steel cords.

12. The motorcycle tyre according to claim 1, wherein the parameter (A) is in a range of 2500 to 5000.

13. The motorcycle tyre according to claim 1, wherein the parameter (A) is in a range of 3000 to 4500.

14. The motorcycle tyre according to claim 1, wherein the steel cords comprise a plurality of twisted filaments and rubber filled between the plurality of filaments.

15. The motorcycle tyre according to claim 1, wherein
the band ply is formed by winding a ribbon ply spirally in the tyre circumferential direction, and
the ribbon ply comprises five or less of the steel cords and a topping rubber coating the steel cords.

16. The motorcycle tyre according to claim 1, wherein the parameter (A) is in a range of 3000 to 4500.

* * * * *